United States Patent
Cho et al.

(10) Patent No.: US 7,894,381 B2
(45) Date of Patent: Feb. 22, 2011

(54) SYSTEM AND METHOD OF RELIABLY BROADCASTING DATA PACKET UNDER AD-HOC NETWORK ENVIRONMENT

(75) Inventors: Song-yean Cho, Seoul (KR); Jin-hyun Sin, Seoul (KR); Byung-in Mun, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1267 days.

(21) Appl. No.: 10/791,544

(22) Filed: Mar. 3, 2004

(65) Prior Publication Data

US 2004/0174844 A1 Sep. 9, 2004

(30) Foreign Application Priority Data

Mar. 4, 2003 (KR) .................. 10-2003-0013532
Feb. 10, 2004 (KR) .................. 10-2004-0008652

(51) Int. Cl.
*H04W 4/00* (2009.01)
(52) U.S. Cl. ..................... 370/328; 370/230
(58) Field of Classification Search .......... 370/394, 370/389, 392, 352, 338, 254, 310, 236, 410, 370/329, 401, 439, 400, 258, 85, 469; 709/238
See application file for complete search history.

(56) References Cited

U.S. PATENT DOCUMENTS

| | | | | |
|---|---|---|---|---|
| 5,488,608 A * | 1/1996 | Flammer, III | ............... | 370/400 |
| 6,115,393 A * | 9/2000 | Engel et al. | ............... | 370/469 |
| 6,493,767 B1 * | 12/2002 | Ishida et al. | ............... | 709/249 |
| 6,697,331 B1 * | 2/2004 | Riihinen et al. | ............... | 370/236 |
| 6,917,985 B2 * | 7/2005 | Madruga et al. | ............... | 709/238 |
| 7,002,944 B2 * | 2/2006 | Kats et al. | ............... | 370/338 |
| 7,031,288 B2 * | 4/2006 | Ogier | ............... | 370/338 |
| 7,058,071 B1 * | 6/2006 | Myles et al. | ............... | 370/419 |
| 7,184,421 B1 * | 2/2007 | Liu et al. | ............... | 370/338 |
| 2003/0099221 A1 * | 5/2003 | Rhee | ............... | 370/338 |
| 2004/0008652 A1 * | 1/2004 | Tanzella et al. | ............... | 370/338 |
| 2004/0213167 A1 * | 10/2004 | Garcia-Luna-Aceves et al. | ............... | 370/254 |

FOREIGN PATENT DOCUMENTS

| | | |
|---|---|---|
| JP | 8-37531 A | 2/1996 |
| JP | 9-261255 A | 10/1997 |
| JP | 11-331234 A | 11/1999 |

\* cited by examiner

*Primary Examiner*—Kwang B Yao
*Assistant Examiner*—Syed Bokhari
(74) *Attorney, Agent, or Firm*—Sughrue Mion, PLLC

(57) ABSTRACT

A system for reliably broadcasting a data packet under an ad-hoc network environment including a determining unit for determining whether or not at least one node receiving the broadcast data packet is a relay node, a comparing unit for comparing a first relay node sequence number contained in a management packet which the node transmits with a second relay node sequence number stored in a neighbor table of the node, and a control unit for determining whether or not the data packet is retransmitted to the node according to a result of the comparison of the comparing unit. By comparing the second relay node sequence number stored in the neighbor table of the node which has broadcast the data packet with the first relay node sequence numbers transmitted through a Hello packet, it is possible to check whether or not the data packet is lost during broadcasting, and thus it is possible to reduce a loss factor of the data packet which is generated during broadcasting. Thereby, the data packet can be reliably broadcast.

28 Claims, 12 Drawing Sheets

SYSTEM AND METHOD OF RELIABLY BROADCASTING DATA PACKET UNDER AD-HOC NETWORK ENVIRONMENT

BACKGROUND OF THE INVENTION

This application claims priority from Korean Patent Application Nos. 10-2003-0013532 and 10-2004-0008652 filed on Mar. 4, 2003 and Feb. 10, 2004, respectively, in the Korean Intellectual Property Office, the disclosures of which are incorporated herein by reference.

1. Field of the Invention

The present invention relates to a reliable broadcast system and method thereof operated under an ad-hoc network environment and, more particularly, to a system and method for reliably broadcasting a data packet under an ad-hoc network environment, thereby decreasing any loss of data packets as well as an overload of the entire system under the ad-hoc network environment.

2. Description of the Related Art

Generally, mobile ad-hoc networks serve to provide multi-hop based communication services with mobile terminals connected by wireless links, whereby it is possible to configure a network between wireless terminals under a non-infrastructure environment.

Due to the inherent nature of the wireless multi-hop, these mobile ad-hoc networks have a wide interference area wherein mobile nodes overlap. Within these overlapping areas which there is a high probability of generating a collision between data in the air during data transmission/reception. To avoid such a collision, a channel reservation mechanism is used based on the procedure of RTS (request-to-send)-CTS (clear-to-send)-data-ACK (acknowledgement), which is used only for unicast, but not used for broadcast.

With use of the channel reservation mechanism for the broadcast, the channel reservation mechanism must be applied to all the respective neighboring nodes. Hence, when data passes through only to one adjacent hop consisting of a plurality of nodes, a time equal to [the number of neighboring nodes * T(RTS-CTS-data-ACK)] is consumed. In the worst case, this time is increased by a value equal to (1+collision times){the number of neighboring nodes * T(RTS-CTS-data-ACK)}.

Because the channel reservation mechanism is not used for broadcasting on the mobile ad-hoc network, the probability of the data collision in the air becomes higher, thereby deteriorating the reliability of data transmission.

When an ACK-based mechanism is used to solve this problem, ACKs must be received from all neighboring nodes. Thus, the minimum time equal to [the number of neighboring nodes * T(ACK)] is consumed only for receiving the ACKs.

FIG. 1 shows a general mobile ad-hoc network environment, under which mobile nodes are connected by wireless links without any infrastructure.

As shown in FIG. 1, in the mobile ad-hoc network, a network topology is changed frequently due to the mobility of the nodes constituting the network. Therefore, in order to identify states of neighboring nodes as well as the topology of the entire network, the nodes of the mobile ad-hoc network periodically exchange Hello packets containing both information of their own Internet protocols (IPs) and the identified neighboring nodes.

FIG. 2 shows a process by which each node broadcasts under a conventional mobile ad-hoc network environment, wherein when an arbitrary node Ni intends to broadcast data to all nodes within the network, a flooding approach for relaying the data via neighboring nodes must be used.

Specifically, when an arbitrary sender node Ni (e.g. node N3) broadcasts the data to all nodes within the network, the data which the sender node Ni transmits, as shown, are transmitted to the neighboring nodes of the sender node Ni first (from N3 to N1 and N4). Then, each of the neighboring nodes receiving the data to be broadcast transmits the data to its neighboring nodes again (from N1 to N2, N6 and N7, and from N4 to N5 and N6). Again, each of the neighboring nodes transmits the data to its neighboring nodes. Thus, this transmission procedure allows the data transmitted from the sender node N1 to be transmitted to all the nodes within the network.

Respective nodes are connected by wireless links using an omni antenna, thereby causing the nodes to overlap between a transmission area and a reception area. For instance, the transmission area of the node N3 overlaps transmission areas of the nodes N1 and N4, and also the transmission area of the node N1 overlaps transmission areas of the nodes N2, N6 and N7.

Therefore, in order to broadcast the data with no collision, the data must be continuously transmitted between the nodes having the overlapped transmission area according to a specific timing (see FIG. 3). However, it is impossible to adjust the timing in the mobile ad-hoc network because the mobile ad-hoc network does not make use of the infrastructure.

In this manner, the unmatched timing between the whole nodes results in generating a collision between the data during broadcasting. After the collision, data transmission is delayed as shown in FIG. 4. Ultimately, some nodes fail to receive the broadcast data.

FIG. 5 shows another process by which each node broadcasts under a conventional mobile ad-hoc network environment.

Here, an approach of transmitting ACKs is used to determine whether or not the broadcast data is transmitted again, thereby preventing a situation where some nodes do not receive the broadcast data. Because the ACKs must be received from all neighboring nodes, the time required to broadcast the data results in an increase of a unit time in proportion to the number of the neighboring nodes whenever a data packet moves from one hop to another hop, so that the use of the ACKs causes the data transmission to be greatly delayed. Further, to avoid a collision between the ACKs during their transmission, which may result from the overlap between transmission and reception areas of the nodes, the ACKs must be transmitted after the timing is adjusted at each node, i.e., they must be continuously transmitted (see FIG. 6).

SUMMARY OF THE INVENTION

To solve the above-indicated problems, it is, therefore, an object of the present invention to provide a system and method for reliably broadcasting a data packet under an ad-hoc network environment, in which at least one node broadcasts the data packet and then compares it with relay node sequence numbers to check whether or not the data packet was lost during broadcasting, thereby allowing the data packet to be reliably broadcast.

It is another object of the invention to provide a system and method for reliably broadcasting a data packet under an ad-hoc network environment, thereby reducing overload of the entire system by setting at least one neighboring node as a relay node.

In order to achieve these objectives, according to one aspect of the invention, there is provided a system for reliably broadcasting a data packet under an ad-hoc network environment. The system comprises a comparing unit for comparing a first relay node sequence number with a second relay node sequence number, wherein the first relay node sequence number is contained in a management packet which is transmitted by at least one node receiving the data packets, and the second relay node sequence number is stored in a neighbor table of the node. Further, the system comprises a control unit for determining whether or not the data packet is retransmitted to the node according to a result of the comparison of the comparing unit.

According to another aspect of the invention, there is provided a system for reliably broadcasting a data packet under an ad-hoc network environment. The system comprises a determining unit, a comparing unit and a control unit. The determining unit determines whether or not at least one node receiving the data packet is a relay node which transmits the received data packet to other neighboring nodes. The comparing unit compares a first relay node sequence number with a second relay node sequence number, wherein the first relay node sequence number is contained in a management packet which the node receiving the data packet transmits, and the second relay node sequence number is stored in a neighbor table of the node. The control unit determines whether or not to retransmit the data packet to the node according to a result of the comparison by the comparing unit.

Further, the control unit transmits the data packet in a state where after adding "1" to the second relay node sequence number, the resulting sequence number is included in the data packet.

The system further comprises a memory unit which includes the neighbor table drafted on the basis of information of the management packet transmitted from the node.

Preferably, the data packet includes at least one of the Internet protocol addresses of neighboring nodes, relay nodes, link status, and relay node sequence numbers. Also, the neighbor table is updated on the basis of the information of the management packet at a predetermined time.

According to yet another aspect of the invention, there is provided a method for reliably broadcasting a data packet under an ad-hoc network environment. The method comprises broadcasting the data packet to neighboring nodes; comparing a first relay node sequence number with a second relay node sequence number, the first relay node sequence number being contained in a management packet which each of the neighboring nodes transmits, the second relay node sequence number being stored in a neighbor table of each of the neighboring nodes; and determining whether or not the data packet is retransmitted to the neighboring nodes according to a result of the comparison.

According to yet another aspect of the invention, there is provided a method for reliably broadcasting a data packet under an ad-hoc network environment, the method comprising checking whether at least one node receiving the data packet is a relay node; as a result of checking, when the node is the relay node, broadcasting the data packet to neighboring nodes; comparing a first relay node sequence number with a second relay node sequence number, the first relay node sequence number being contained in a management packet which each of the neighboring nodes transmits, the second relay node sequence number being stored in a neighbor table of each of the neighboring nodes; and determining whether or not the data packet is retransmitted to the neighboring nodes according to a result of the comparison.

Preferably, the step of broadcasting comprises adding "1" to the second relay node sequence number which is stored in the neighbor table of each of the neighboring nodes; adding the resulting relay node sequence number and predetermined information to the data packet; storing information of the data packet in the neighbor table; and broadcasting the data packet to the neighboring nodes.

Furthermore, the step of comparing comprises receiving the management packet from the neighboring nodes; and comparing the first relay node sequence number contained in the management packet which each of the neighboring nodes transmits, with the second relay node sequence number stored in the neighbor table of each of the neighboring nodes.

In addition, the step of determining comprises a result of the comparison, when the first and second relay node sequence numbers are equal to each other, terminating transmission of the data packet; and when the first and second relay node sequence numbers are not equal, retransmitting the data packet to the neighboring nodes.

More preferably, retransmission of the data packet is set to occur a predetermined number of times, and when the number of times the data packet is retransmitted exceeds the set number of times, retransmitting the data packet is stopped. Also, when the first and second relay node sequence numbers are not equal, the neighbor table is updated with a relatively large relay node sequence number.

In addition, the data packet includes at least one of the Internet protocol addresses of neighboring nodes, relay nodes, link status, and relay node sequence numbers. And the neighbor table is updated on the basis of information of the management packet every predetermined time.

Further, the method further comprises the step of, as a result of checking, when the node is not the relay node, storing information of the received data packet in the neighbor table.

BRIEF DESCRIPTION OF THE DRAWINGS

The above objectives, features and advantages of the present invention will become more apparent from the following detailed description when taken in conjunction with the accompanying drawings, in which.

DETAILED DESCRIPTION OF THE PREFERRED EMBODIMENT

A preferred embodiment of the invention will be described below in detail with reference to the accompanying drawings.

Figure 1:
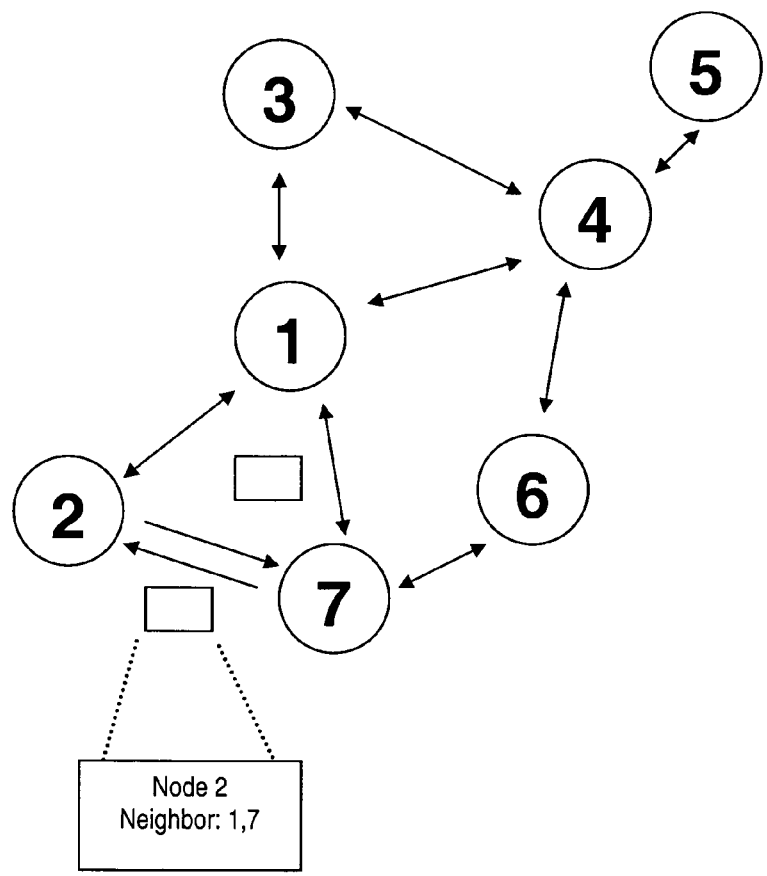
FIG. 1 shows a general conventional ad-hoc network environment.
Figure 2:
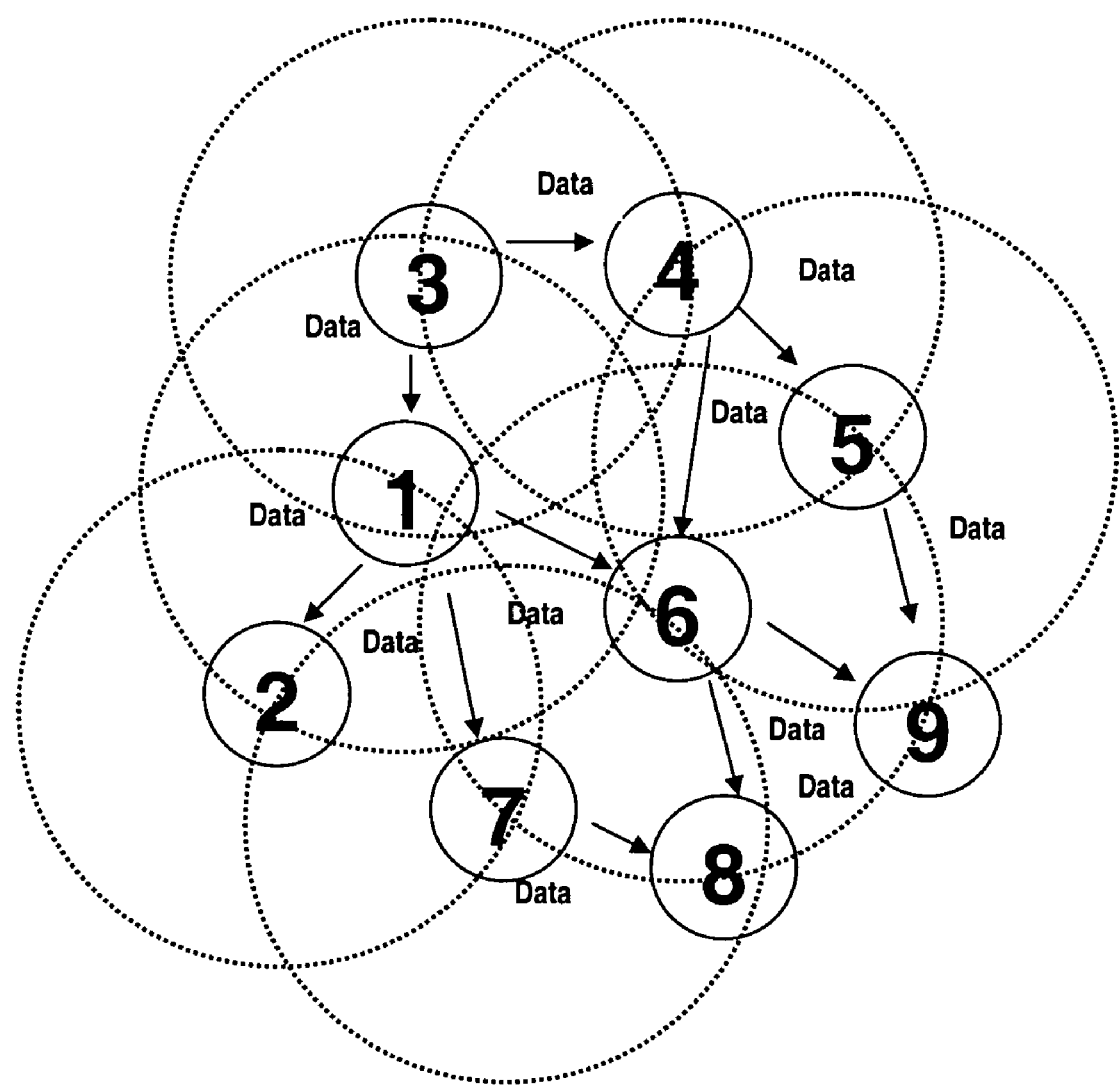
FIG. 2 shows a process by which each node performs broadcasting under a conventional ad-hoc network environment.
Figure 3:
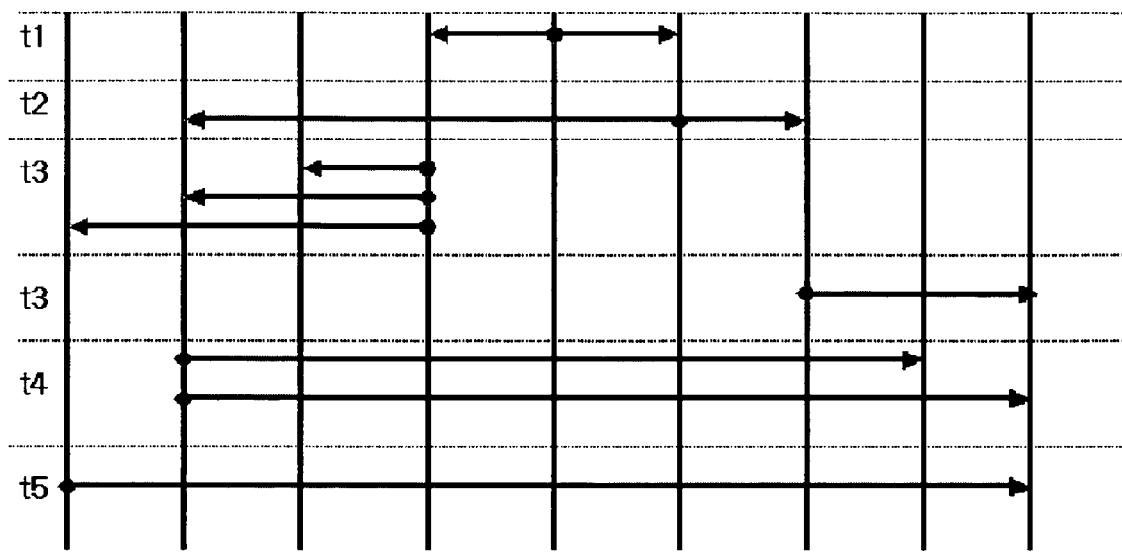
FIG. 3 shows transmission timing between nodes with an overlapped area so that broadcasting is performed without a collision under a conventional ad-hoc network environment.
Figure 4:
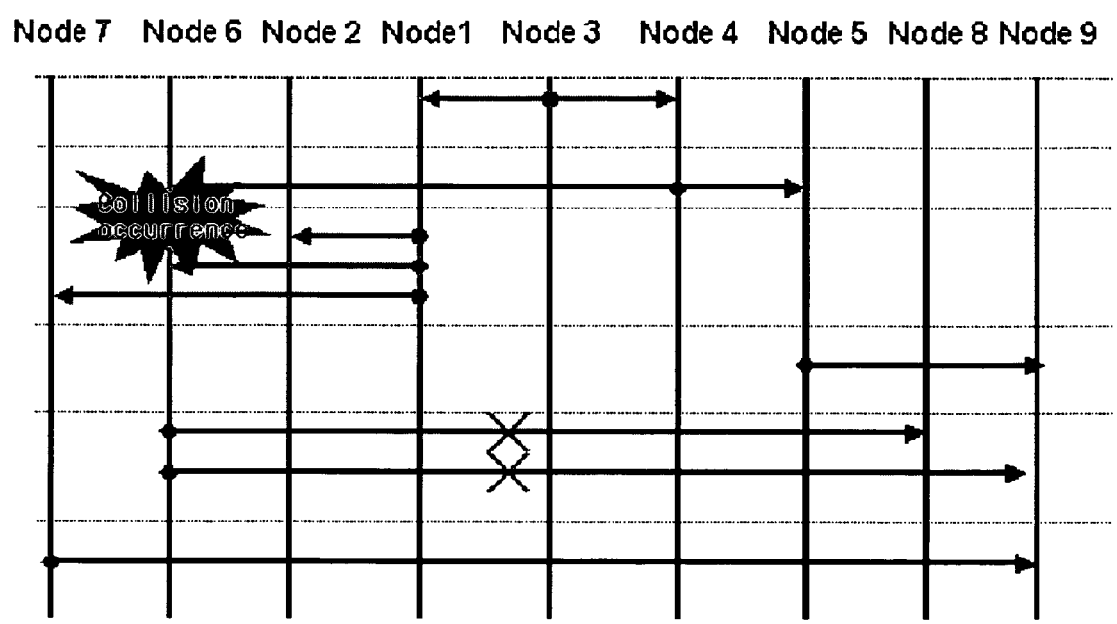
FIG. 4 shows a collision generated during broadcasting under a conventional ad-hoc network environment.
Figure 5:
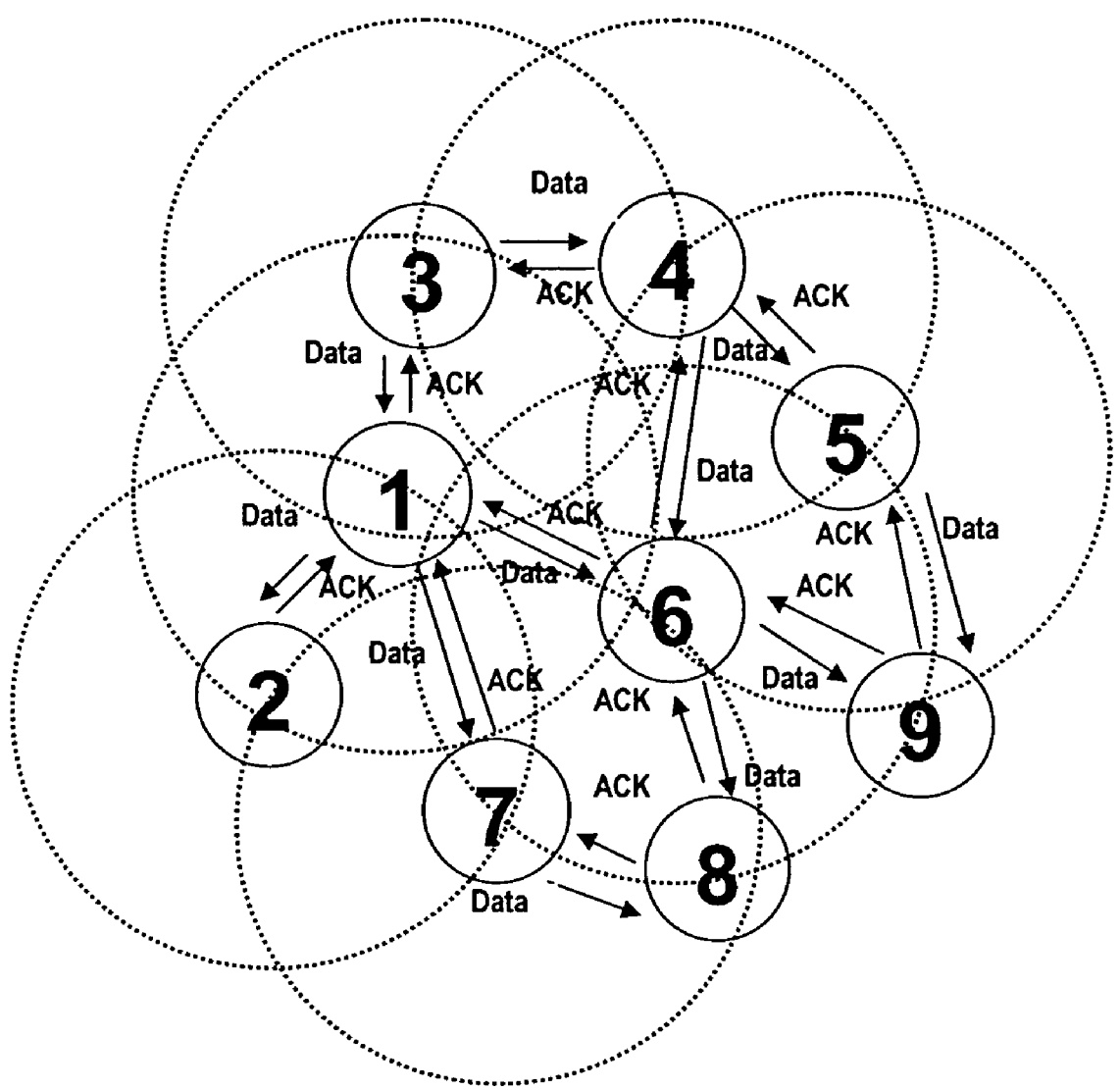
FIG. 5 shows another process by which each node performs broadcasting under a conventional mobile ad-hoc network environment.
Figure 6:
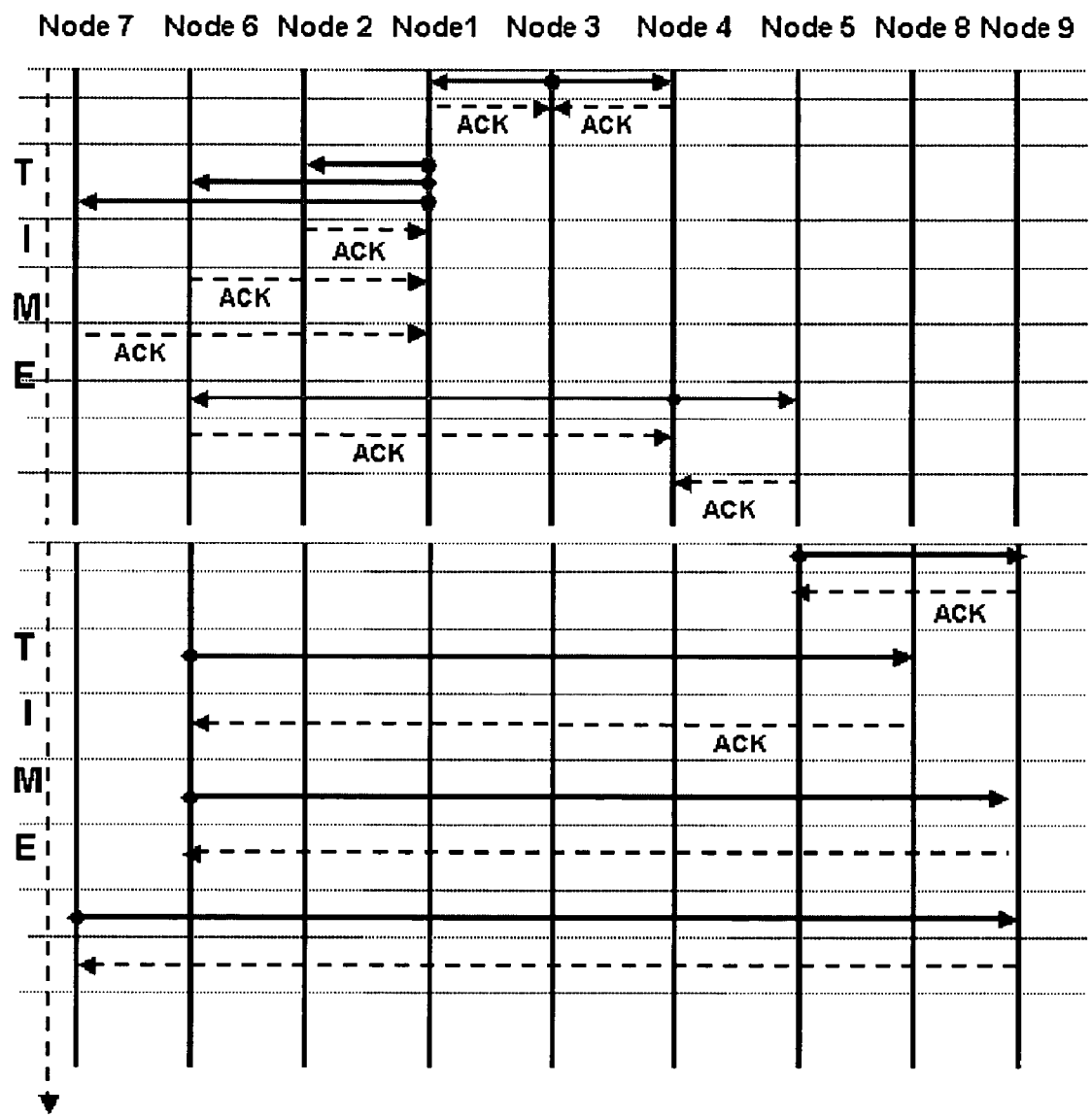
FIG. 6 shows transmission timing between nodes with an overlapped area so that ACK data are transmitted without a collision under a conventional ad-hoc network environment.
Figure 7:
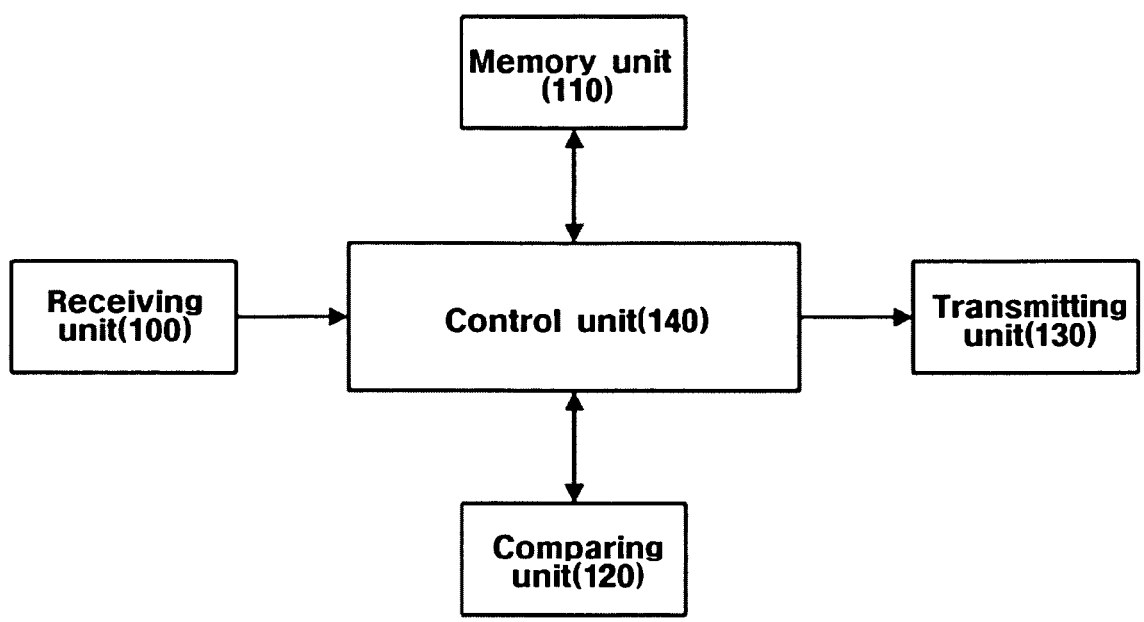
FIG. 7 is a schematic block diagram showing a system for reliably broadcasting a data packet under an ad-hoc network environment according to one embodiment of the invention.

FIG. 7 is a schematic block diagram showing a system for reliably broadcasting a data packet under an ad-hoc network environment according to one embodiment of the invention.

The system includes a receiving unit 100, a memory unit 110, a comparing unit 120, a transmitting unit 130 and a control unit 140.

The receiving unit 100 receives a data packet and a management packet that a predetermined node broadcasts. Here, the data packet contains various information, such as Internet protocol (IP) addresses of neighboring nodes, relay node, link status, relay node sequence numbers and so on, and the management packet refers to a packet (e.g., beacon of IEEE 802.11a) transmitted to share general information of the ad-hoc network, a packet transmitted for entry/departure into/from the ad-hoc network, or so on. Herein, the best example of the management packet, a Hello packet will be described.

The memory unit 110 contains a neighbor table drafted on the basis of information of the management packets transmitted from the neighboring nodes. When the information of the neighboring nodes is transmitted through the management packets, the neighbor table is updated by the information of the transmitted management packets.

The comparing unit 120 compares a first relay node sequence number contained in the management packet which a predetermined node has transmitted, with a second relay node sequence number stored in a neighbor table of the predetermined node, and informs the control unit 140 of the result of the comparison. Here, the first relay node sequence number refers to the sequence number contained in the management packet which the predetermined node has transmitted, while the second relay node sequence number may be understood as an inherent sequence number which the relay node has stored in its own neighbor table. Further, as a result of comparing the first relay node sequence number contained in the management packet which the predetermined node has transmitted with the second relay node sequence number stored in the neighbor table of the predetermined node, when the first and second relay node sequence numbers are equal, the control unit 140 determines that the data packet has been broadcast normally to the neighboring nodes. However, when the first and second relay node sequence numbers are not equal, the control unit 140 determines that the data packet has been lost during broadcasting.

The transmitting unit 130 broadcasts the data or management packet to the neighboring nodes.

The control unit 140 determines whether or not retransmission of the data packet is required depending on the compared result of the comparing unit 120. Specifically, upon receipt of the result of the sequence number comparison from the comparing unit 120, the control unit 140 determines whether or not the data packet is lost, and then, according to the determined result, determines whether or not the data packet is transmitted again. Further, when determining whether the data packet should be transmitted again, the control unit 140 causes the transmitting unit 130 to broadcast the data packet where "1" is added to the second relay node sequence number sent to the neighboring nodes.

Figure 8:
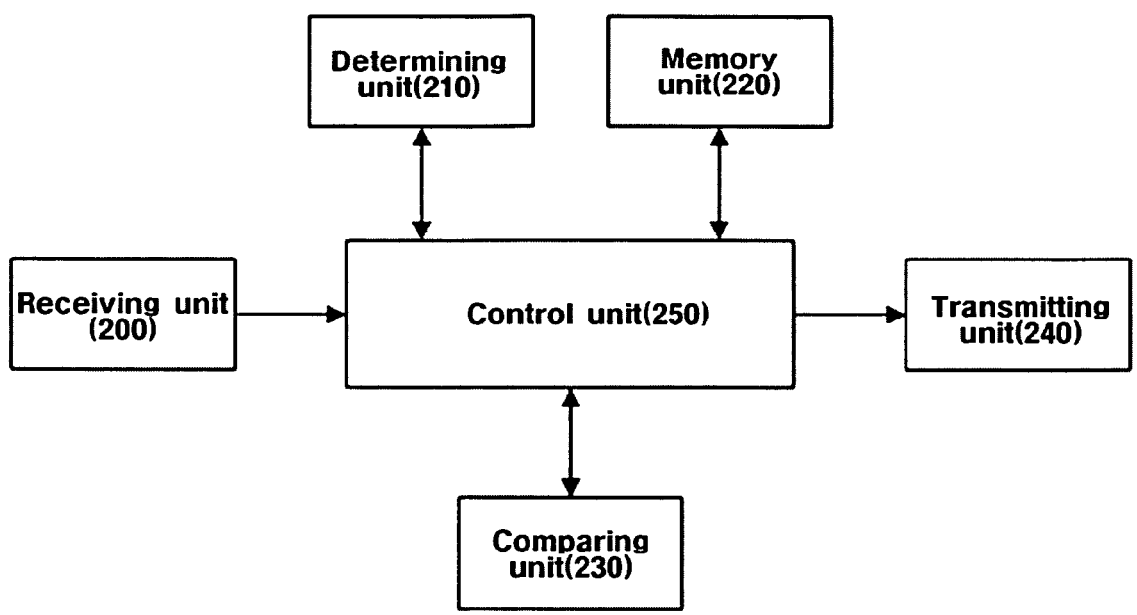
FIG. 8 is a schematic block diagram showing a system for reliably broadcasting a data packet under an ad-hoc network environment according to another embodiment of the invention.

FIG. 8 is a schematic block diagram showing a system for reliably broadcasting a data packet under an ad-hoc network environment according to another embodiment of the invention. The system includes a receiving unit 200, a determining unit 210, a memory unit 220, a comparing unit 230, a transmitting unit 240 and a control unit 250.

The receiving unit 200 receives a data packet and a management packet that a predetermined node broadcasts, and performs the same function as the receiving unit 100 of FIG. 7.

The determining unit 210 receives the data packet which a predetermined node broadcasts, and determines whether or not the predetermined node is a relay node. Here, the relay node functions to broadcast the data packet, which the predetermined node transmits, to neighboring nodes. Among the nodes on the ad-hoc network, only a node set as the relay node is capable of broadcasting the data packet to the neighboring nodes. Further, the relay node or sender node updates the second relay node sequence number, adds the updated relay node sequence number to the data packet, and transmits the added data packet. Meanwhile, a node having information on the maximum number of nodes is selected as the relay node based on neighbor tables of each node.

How to determine whether or not the node having received the data packet is the relay node will be described later.

The memory unit 220 contains a neighbor table drafted on the basis of information of the management packets transmitted from the neighboring nodes. When the information of the neighboring nodes is transmitted through the management packets, the neighbor table is updated by the information of the transmitted management packets.

The comparing unit 230 compares a first relay node sequence number contained in the management packet which a predetermined node has transmitted, with a second relay node sequence number stored in a neighbor table of the predetermined node, and informs the control unit 250 of the result. Here, the first relay node sequence number refers to the sequence number contained in the management packet which the predetermined node has transmitted, while the second relay node sequence number may be understood as an inherent sequence number which the relay node has stored in its own neighbor table. Further, as a result of comparing the first relay node sequence number contained in the management packet which the predetermined node has transmitted with the second relay node sequence number stored in the neighbor table of the predetermined node, when the first and second relay node sequence numbers are equal, the control unit 250 determines that the data packet was broadcast normally to the neighboring nodes. However, when the first and second relay node sequence numbers are not equal, the control unit 250 determines that the data packet was lost during broadcasting.

The transmitting unit 240 broadcasts the data or management packets to the neighboring nodes.

The control unit 250 determines whether retransmission of the data packets is necessary depending on the result of the comparing unit 230. Specifically, when receiving the result of the comparison between broadcast sequence numbers from the comparing unit 230, the control unit 250 determines whether or not the data packet is lost, and then, according to the determined result, determines whether or not the data packet is transmitted again. Further, when determining that the data packet should be transmitted again, the control unit 250 causes the transmitting unit 240 to broadcast the data packet where "1" is added to the second relay node sequence number sent to the neighboring nodes.

Figure 9:
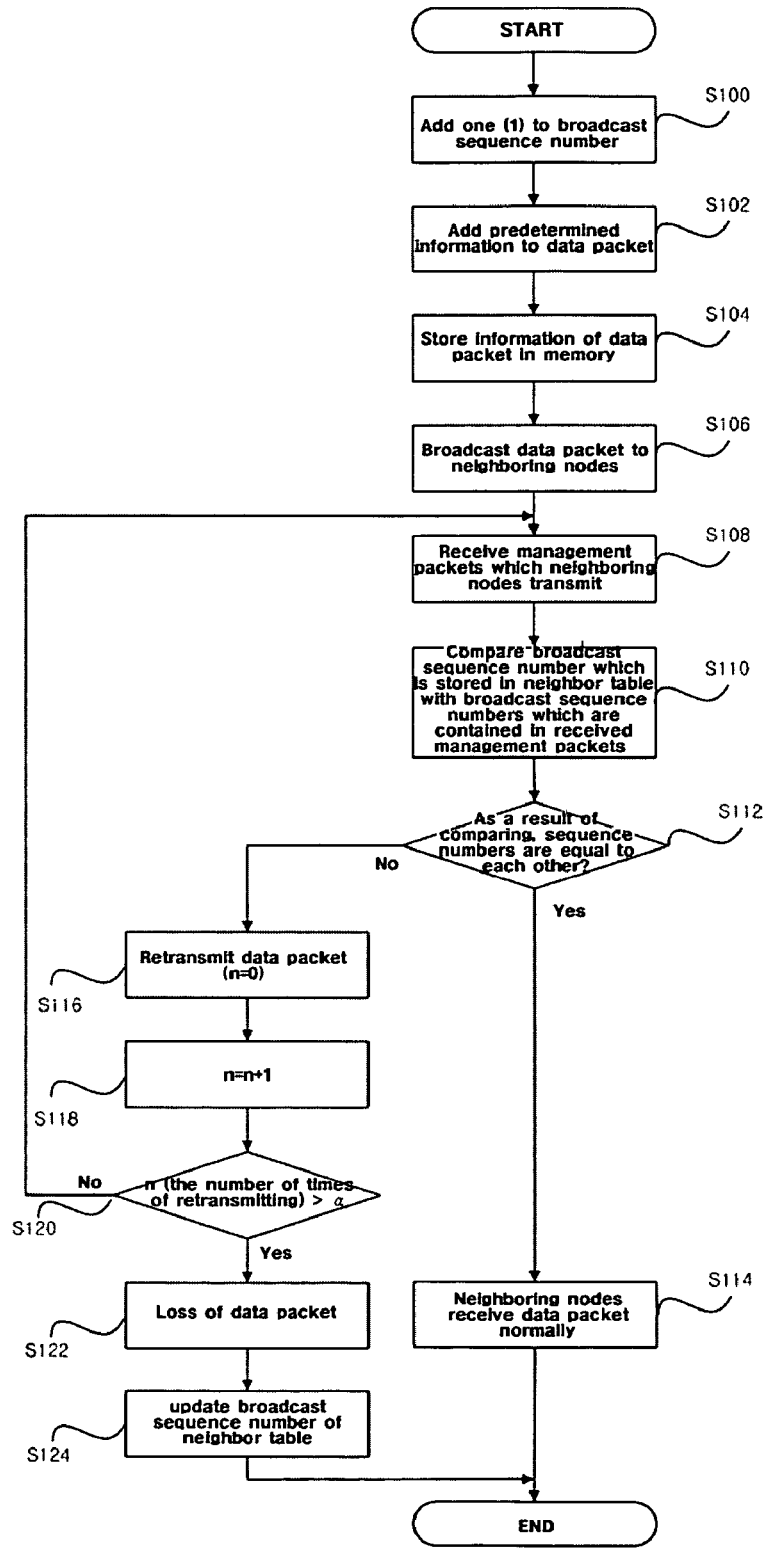
FIG. 9 is a schematic flow chart showing a process of broadcasting a data packet in a method for reliably broadcasting the data packet under an ad-hoc network environment in accordance with the invention.

FIG. 9 is a schematic flow chart showing a process of broadcasting a data packet in a method for reliably broadcasting the data packet under an ad-hoc network environment in accordance with the invention. To begin with, a predetermined node (sender node) increases its own sequence number (second relay node sequence number) by "1" more (S100), and adds the increased sequence number and predetermined information (IP addresses of neighboring nodes, relay node, link status, etc.) to the data packet (S102).

Then, information of the data packet is stored in the neighbor table within the memory unit 110 (S104), and the data packet is broadcast to the neighboring nodes through the transmitting unit 130 (S106).

The sender node receives management packets (i.e., Hello packets), which the neighboring nodes transmit, through the receiving unit 100 (S108), and the first relay node sequence number contained in the Hello packets and the second relay node sequence number stored in the neighbor table of the predetermined or sender node are compared by the comparing unit 120 (S110). Here, as a result of comparing the sequence numbers, when the sequence numbers are equal to each other (S112), the control unit 140 determines that the data packet is broadcast normally to the neighboring nodes (S114), and thus transmission of the data packet is terminated. However, when the sequence numbers are not equal to each other (S112), the control unit 140 determines that the data packet is lost while the data packet is broadcast to the neighboring nodes (S116), and thus retransmission of the data packet takes place.

Further, the number of times n of retransmitting the data packet is set to a predetermined number of times α. If the number of times of requesting the retransmission of the data packet exceeds the set number of times, the retransmission of the data packet is stopped, and the neighbor table is updated with a relatively large relay node sequence number (S118 to S124).

Here, the neighbor table is updated on the basis of information of the management packets (or Hello packets) every predetermined time.

Figure 10:
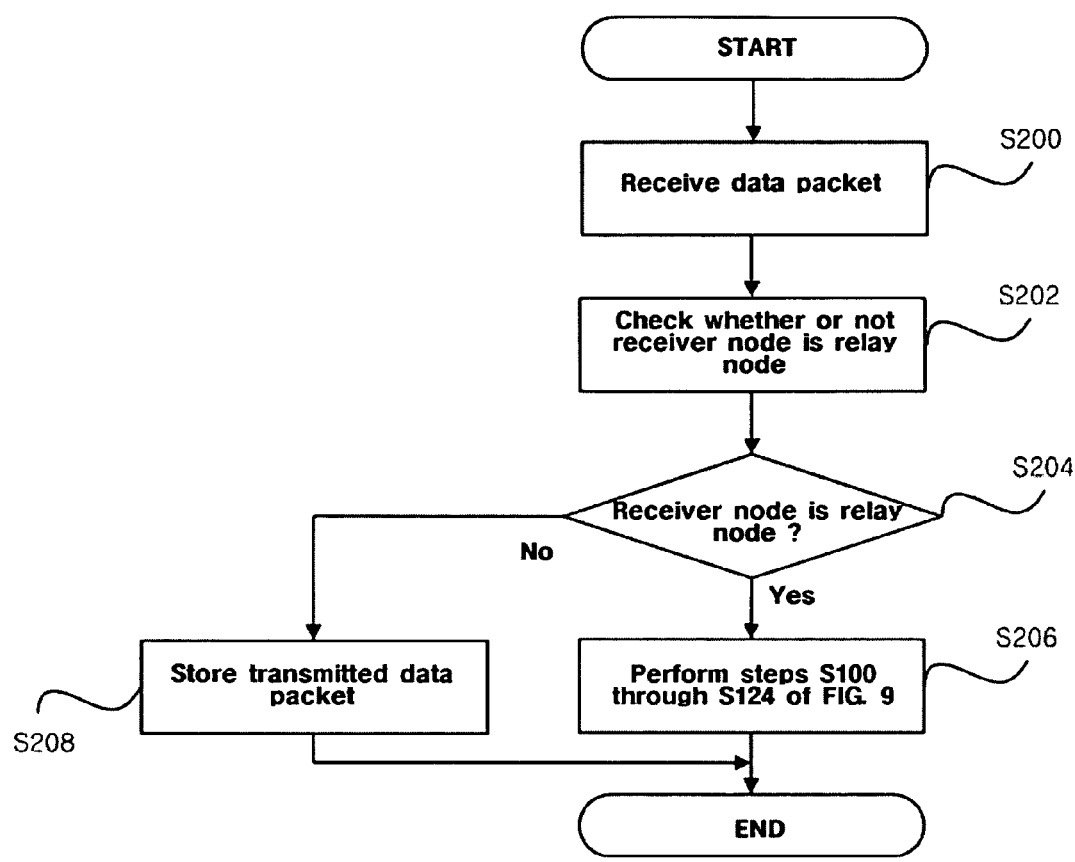
FIG. 10 is a schematic flow chart showing a process of determining whether or not at least one receiver node receiving a data packet is a relay node in a method for reliably broadcasting the data packet under an ad-hoc network environment in accordance with preferred embodiments of the invention.

FIG. 10 is a schematic flow chart showing a process of determining whether or not at least one receiver node receiving a data packet is a relay node in a method for reliably broadcasting the data packet under an ad-hoc network environment in accordance with preferred embodiments of the invention. To begin with, after the receiver node has received the data packet transmitted from a predetermined node (a sender node) (S200), it is checked through the determining unit 210 whether or not the receiver node is the relay node (S202). Here, whether or not the receiver node is the relay node may be checked through information of the relay node which is contained in the broadcast data packet. Clearly, the information of the relay node which is contained in the data packet transmitted from the predetermined node (the sender node) includes information of a node which is set as the relay node. Thus, the receiver node having received the data packet parses the received data packet to check whether or not the receiver node is set as the relay node in the information of the relay node. Thereby, it is possible to check whether or not the receiver node is the relay node. Herein, in order to check whether or not the receiver node is the relay node, parsing the information of the relay node stored in the data packet is given as one example, but it is possible to do so using various other examples.

Then, as a result of checking, when the receiver node is the relay node, the receiver node broadcasts the data packet to the neighboring nodes. For this purpose, steps S100 through S124 as described with reference to FIG. 9 are performed (S204 and S206).

However, when the receiver node is not the relay node, the receiver node stores the transmitted data packet in its own neighbor table (S208).

Figure 11:
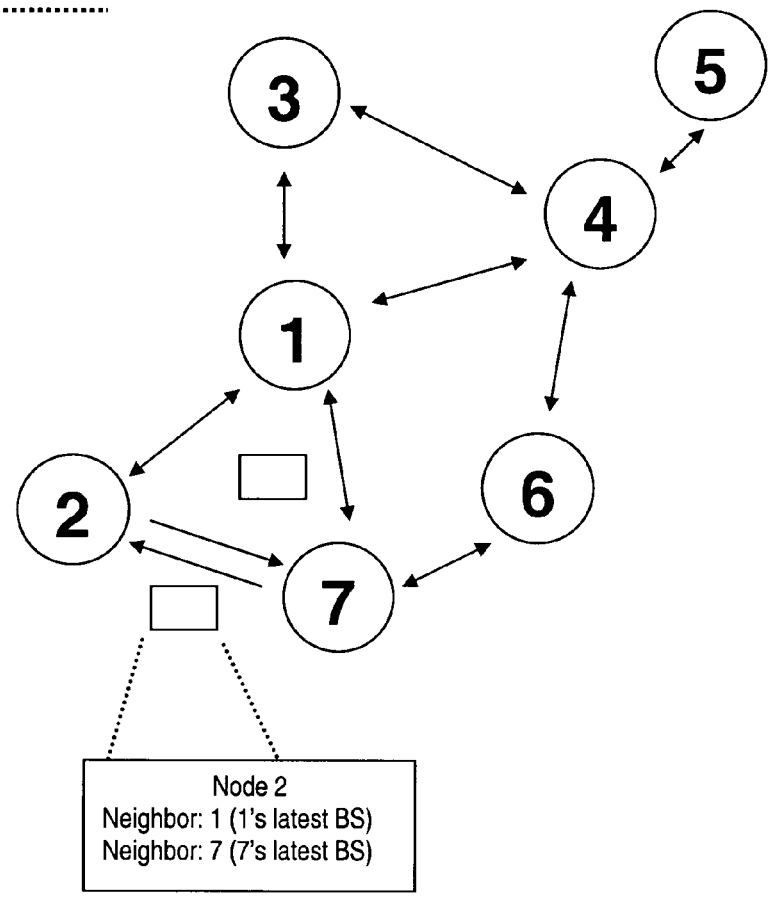
FIG. 11 shows link status between nodes together with a neighbor table under an ad-hoc network environment according to the invention.

FIG. 11 shows link status between nodes together with a neighbor table under an ad-hoc network environment according to the invention.

As shown, each node exchanges Hello packets with other nodes under the ad-hoc network environment, thereby managing information on the neighboring nodes using a table. In other words, the latest relay node sequence number which the neighboring nodes have transmitted through the Hello packets is stored in information tables of existing neighboring nodes. Here, each Hello packet contains information of the neighboring nodes such as IP address, link status, etc., as well as information on the relay node sequence numbers which have recently been received from the neighboring nodes.

For example, the neighbor table shown pertains to the node 2, in which the link status of node 1 and node 7 which are neighboring nodes of node 2, and the relay node sequence numbers which have been received recently from these neighboring nodes, are stored.

Figure 12:
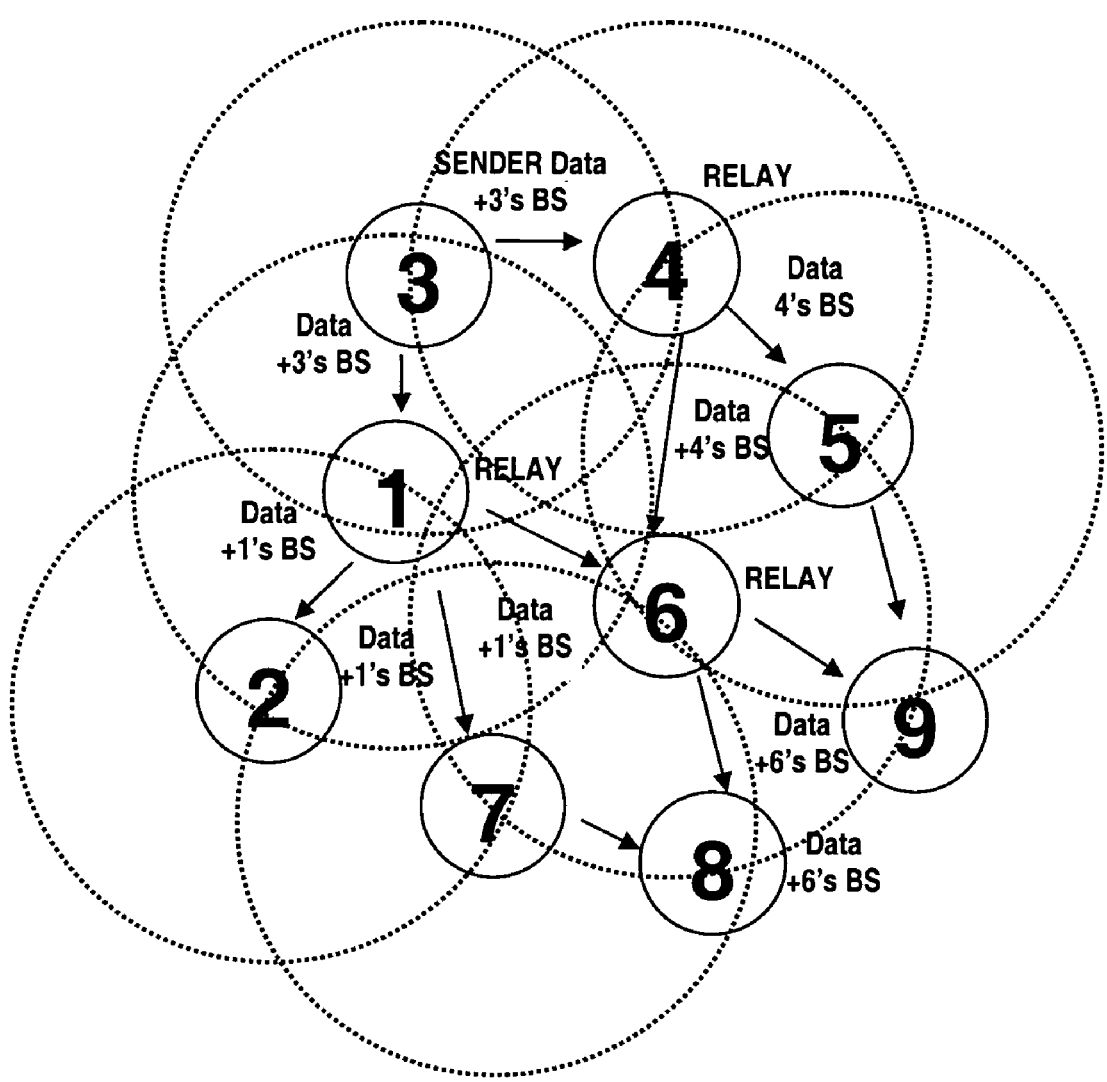
FIG. 12 shows a process of transmitting sequence numbers to neighboring nodes through a data packet under an ad-hoc network environment in accordance with the invention.

FIG. 12 shows a process of transmitting sequence numbers to neighboring nodes through a data packet under an ad-hoc network environment in accordance with the invention. As shown, when a predetermined node (a sender node) (e.g., a node 3) broadcasts the data packet to the neighboring nodes, the node 3 adds "1" to its own sequence number (the second relay node sequence number), adds the updated relay node sequence number to the data packet, and then transmits the resulting data packet.

Then, the neighboring nodes (nodes 1 and 4) which receive the data packet transmitted from the predetermined node (the node 3) add "1" to their own broadcast sequence numbers rather than the received relay node sequence number, and then transmit the data packet, to which the updated relay node sequence numbers are added, to their neighboring nodes (from node 1 to nodes 2, 6 and 7, and from node 4 to nodes 5 and 6).

Meanwhile, in the case of broadcasting data packets which all nodes receive under the ad-hoc network environment to all neighboring nodes, there occurs a delay caused by data transmission. For this reason, the invention is designed so that only nodes (e.g., nodes 1, 4 and 6) selected as the relay node are capable of broadcasting the data packet to their neighboring nodes.

The preferred embodiments of the invention will be described with reference to FIG. 12.

First, the node 3 (sender node) increases its own sequence number by "1" adds the updated relay node sequence number (second relay node sequence number) and predetermined information (IP addresses of neighboring nodes, relay node, link status and so on) to the data packet, stores the added data packet in the neighbor table, and broadcasts the stored data packet to its neighboring nodes (nodes 1 and 4).

Then, the node 3 receives the Hello packets which its neighboring nodes (nodes 1 and 4) transmit, and compares the second relay node sequence number stored in its own neighbor table with the first relay node sequence number contained in each of the received Hello packets.

As a result of the comparison, when the first and second relay node sequence numbers are equal, node 3 determines that the data packet is broadcast normally to the neighboring nodes (nodes 1 and 4), thus terminating transmission of the data packet. However, when the first and second relay node sequence numbers are not equal, node 3 determines that the data packet is lost during its broadcast to the neighboring nodes (nodes 1 and 4), thus retransmitting the data packet to the neighboring nodes (nodes 1 and 4).

In this case, the number of times the data packet is retransmitted is set to a predetermined number of times. When the number of times of retransmitting the data packet exceeds the set number of times, node 3 stops retransmitting the data packet to the neighboring nodes (nodes 1 and 4).

Then, nodes 1 and 4 receiving the data packet transmitted from the node 3 check whether or not the nodes 1 and 4 are the relay nodes. Here, node 1 will be taken as an example.

Node 1 parses the received data packet, and checks whether or not node 1 is the relay node through information of the relay node which is contained in the data packet.

As a result of checking, when node 1 is the relay node, node 1 broadcasts the data packet to its neighboring nodes (nodes 2, 6 and 7). Here, for this purpose, node 1 performs the same process as node 3.

Then, neighboring nodes (nodes 2, 6 and 7) receiving the data packet from node 1 check whether or not the neighboring nodes are the relay nodes. As a result of checking, when nodes 2 and 7 are not the relay nodes, but node 6 is the relay node, nodes 2 and 7 store the received data packet in their own neighbor tables, but node 6 broadcasts the data packet to its neighboring nodes (nodes 8 and 9).

Consequently, in the case where the data packet is broadcast, by comparing the second relay node sequence number of the relay node which has broadcast the data packet with the first relay node sequence numbers contained in the management packet of the receiver nodes which receive the broadcast data packet, the invention makes it possible to check whether or not the data packet is lost during its broadcast, and thus, when the data packet is lost, the data packet can be transmitted again.

Further, by selecting at least one of the nodes under the ad-hoc network environment as the relay node and allowing the node selected as the relay node to broadcast the data packet, it is possible, in accordance with the invention, to reduce a quantity of transmission of the data packets between the nodes, and thus it is possible to reduce a collision rate between the data packets.

According to the invention as discussed above, it is checked whether or not the data packet is lost, and thus a loss factor of the data packet generated during broadcasting the data packet can be reduced. Consequently, the data packet can be reliably broadcast.

Further, it is possible to reduce a quantity of transmission of the data packets between the nodes, and thus it is possible to reduce a collision rate between the data packets. Consequently, it is possible to reduce the overload of the entire system.

Although the preferred embodiments and drawings of the present invention have been disclosed for illustrative purposes, those skilled in the art appreciate that various substitutions, modifications, and changes are possible, without departing from the scope and spirit of the invention as disclosed in the accompanying claims. So, this invention should not be construed as limited to the embodiments set fourth herein or accompanying drawings.

What is claimed is:

1. A system for reliably broadcasting a data packet under an ad-hoc network environment, the system comprising:
   a comparing unit which compares a first relay node sequence number with a second relay node sequence number,
   wherein the first relay node sequence number is contained in a management packet, the management packet is transmitted from a predetermined neighboring node to at least one node which receives the first relay node sequence number,
   wherein the at least one node transmits the data packet to the predetermined neighboring node, and
   wherein the second relay node sequence number is stored in a neighbor table of the at least one node;
   a memory unit which stores information of the data packet before the data packet is transmitted to the predetermined neighboring node, wherein the information of the data packet comprises the second relay node sequence number; and
   a control unit which determines whether or not the data packet is retransmitted to the predetermined neighboring node by the at least one node according to a result of the comparison,
   wherein the comparing is performed in the at least one node transmitting the data packet.

2. The system according to claim 1, wherein the control unit transmits the data packet, wherein after adding "1" to the second relay node sequence number, the resulting sequence number is included in the data packet.

3. The system according to claim 1, wherein the memory unit comprises the neighbor table,
   wherein the neighbor table is updated on the basis of information of the management packet received by the at least one node.

4. The system according to claim 1, wherein the data packet includes at least one of Internet protocol addresses of neighboring nodes, relay nodes, link status, and relay node sequence numbers.

5. The system according to claim 3, wherein the neighbor table is updated on the basis of the information of the management packet each of a predetermined number of times.

6. A system for reliably broadcasting a data packet under an ad-hoc network environment, the system comprising:
   a determining unit which determines whether or not at least one node that receives the data packet is a relay node which transmits the received data packet to other neighboring nodes;
   a comparing unit which compares a first relay node sequence number with a second relay node sequence number,
   wherein the first relay node sequence number is contained in a management packet, the management packet is transmitted from a predetermined neighboring node to at least one node which receives the first relay node sequence number
   wherein the at least one node transmits the data packet to the predetermined neighboring node, and
   wherein the second relay node sequence number is stored in a neighbor table of the at least one node that transmits the data packet;
   a memory unit which stores information of the data packet before the data packet is transmitted to the predetermined neighboring node, wherein the information of the data packet comprises the second relay node sequence number; and a control unit which determines whether or not the data packet is retransmitted to the predetermined neighboring node by the at least one node that transmits the data packet according to a result of the comparison, wherein the comparing is performed in the at least one node transmitting the data packet.

7. The system according to claim 6, wherein the control unit transmits the data packet, wherein after adding "1" to the second relay node sequence number, the resulting sequence number is included in the data packet.

8. The system according to claim 6, wherein the memory unit comprises the neighbor table, wherein the neighbor table is updated on the basis of information of the management packet received by the at least one node that transmits the data packet.

9. The system according to claim 6, wherein the data packet includes at least one of Internet protocol addresses of neighboring nodes, relay nodes, link status, and relay node sequence numbers.

10. The system according to claim 8, wherein the neighbor table is updated on the basis of the information of the management packet each of a predetermined number of times.

11. A method for reliably broadcasting a data packet under an ad-hoc network environment, the method comprising:

broadcasting the data packet to neighboring nodes;

comparing a first relay node sequence number with a second relay node sequence number, wherein the first relay node sequence number is contained in a management packet received from the neighboring nodes after broadcasting the data packet to neighboring nodes, wherein the second relay node sequence number is stored in a neighbor table of a broadcasting node which broadcast the data packet to the neighboring nodes;

storing information of the data packet before the data packet is transmitted to the neighboring nodes, wherein the information of the data packet comprises the second relay node sequence number; and determining whether or not the data packet is retransmitted to the neighboring nodes, by the broadcasting node, according to a result of the comparison, wherein the comparing is performed in the at least one node transmitting the data packet.

12. The method according to claim 11, wherein the step of broadcasting comprises:

adding "1" to the second relay node sequence number which is stored in the neighbor table of each of the neighboring nodes; and adding the resulting relay node sequence number and predetermined information to the data packet.

13. The method according to claim 11, wherein the step of comparing comprises:

receiving the management packet from the neighboring nodes; and comparing the first relay node sequence number contained in the received management packet with the second relay node sequence number stored in the neighbor table of the node broadcasting the data packet.

14. The method according to claim 11, wherein the step of determining comprises:

as a result of the comparison, when the first and second relay node sequence numbers are equal, terminating transmission of the data packet; and when the first and second relay node sequence numbers are not equal to each other, retransmitting the data packet to the neighboring nodes.

15. The method according to claim 14, wherein a number of times for retransmitting the data packet is set to a predetermined number of times, and when the number of times the data packet has been retransmitted exceeds the set number of times, retransmitting the data packet is stopped.

16. The method according to claim 15, wherein, when the first and second relay node sequence numbers are not equal, the neighbor table is updated with a relatively large relay node sequence number.

17. The method according to claim 11, wherein the data packet includes at least one of Internet protocol addresses of neighboring nodes, relay nodes, link status, and relay node sequence numbers.

18. The method according to claim 15, wherein the neighbor table is updated on the basis of information of the management packet each of the predetermined number of times.

19. A method for reliably broadcasting a data packet under an ad-hoc network environment, the method comprising:

checking whether at least one node operable to receive the data packet is a relay node;

as a result of checking, when the node is a relay node, broadcasting the data packet to neighboring nodes by the at least one node;

comparing a first relay node sequence number with a second relay node sequence number, wherein the first relay node sequence number is contained in a management packet which each of the neighboring nodes transmits after broadcasting the data packet to neighboring nodes, wherein the second relay node sequence number is stored in a neighbor table of the at least one node, storing information of the data packet before the data packet is transmitted to the neighboring nodes, wherein the information of the data packet comprises the second relay node sequence number; and determining whether or not the data packet is retransmitted to the neighboring nodes, by the at least one node, according to a result of the comparison, wherein the comparing is performed in the at least one node broadcasting the data packet.

20. The method according to claim 19, wherein the step of broadcasting comprises:

adding "1" to the second relay node sequence number which is stored in the neighbor table of each of the neighboring nodes; and adding the resulting relay node sequence number and predetermined information to the data packet.

21. The method according to claim 19, wherein the step of comparing comprises:

receiving the management packet from the neighboring nodes; and comparing the first relay node sequence number contained in the management packet which each of the neighboring nodes transmits, with the second relay node sequence number stored in the neighbor table of the at least one node.

22. The method according to claim 19, wherein the step of determining comprises:

as a result of the comparison, when the first and second relay node sequence numbers are equal, terminating transmission of the data packet; and when the first and second relay node sequence numbers are not equal, retransmitting the data packet to the neighboring nodes.

23. The method according to claim 22, wherein retransmission of the data packet is set to occur a predetermined number of times, and when the number of times the data packet is retransmitted exceeds the set number of times, retransmitting the data packet is stopped.

24. The method according to claim 23, wherein, when the first and second relay node sequence numbers are not equal, the neighbor table is updated with a relatively large relay node sequence number.

25. The method according to claim 19, wherein the data packet includes at least one of Internet protocol addresses of the neighboring nodes, relay nodes, link status, and relay node sequence numbers.

26. The method according to claim 23, wherein the neighbor table is updated on the basis of information of the management packet each of the predetermined number of times.

27. The method according to claim 19, further comprising the step of; as a result of checking, when the node is not the relay node, storing information of the received data packet in the neighbor table.

28. The system according to claim 1, wherein the management packet is transmitted by a node which receives the data packet transmitted by the at least one node.

* * * * *